United States Patent
Handley et al.

(10) Patent No.: US 7,376,280 B2
(45) Date of Patent: May 20, 2008

(54) VIDEO ENCODING AND DECODING

(75) Inventors: Maynard Handley, Cupertino, CA (US); Roger Kumar, San Francisco, CA (US); Thomas Pun, Sunnyvale, CA (US); Xiaochun Nie, Cupertino, CA (US); Hsi-Jung Wu, Sunnyvale, CA (US)

(73) Assignee: Apple Inc, Cupertino, CA (US)

( * ) Notice: Subject to any disclaimer, the term of this patent is extended or adjusted under 35 U.S.C. 154(b) by 653 days.

(21) Appl. No.: 10/427,889

(22) Filed: Apr. 30, 2003

(65) Prior Publication Data

US 2004/0047512 A1    Mar. 11, 2004

Related U.S. Application Data

(60) Provisional application No. 60/396,157, filed on Jul. 14, 2002.

(51) Int. Cl.
| | |
|---|---|
| G06K 9/36 | (2006.01) |
| G06K 9/46 | (2006.01) |
| H04B 1/66 | (2006.01) |
| H04N 1/41 | (2006.01) |
| H04N 7/12 | (2006.01) |
| H04N 11/02 | (2006.01) |
| H04N 11/04 | (2006.01) |

(52) U.S. Cl. .................. 382/248; 382/250; 348/395.1; 348/403.1; 358/426.14; 375/240.2

(58) Field of Classification Search ................ 382/248, 382/250; 348/395.1, 403.1; 358/426.14; 375/240.2

See application file for complete search history.

(56) References Cited

U.S. PATENT DOCUMENTS

| | | | |
|---|---|---|---|
| 5,550,765 | A | 8/1996 | Bhattacharya et al. |
| 5,754,456 | A | 5/1998 | Eitan et al. |
| 5,754,457 | A * | 5/1998 | Eitan et al. .................. 708/402 |
| 6,175,653 | B1 * | 1/2001 | de Queiroz ................. 382/233 |
| 6,243,730 | B1 | 6/2001 | Wang |
| 6,298,166 | B1 * | 10/2001 | Ratnakar et al. ............ 382/248 |

(Continued)

OTHER PUBLICATIONS

Basoglu et al., "The Equator MAP-CA DSP: An End-to-End Broadband Signal Processor VLIW," IEEE Trans. Circuits and Systems for Video Technology, vol. 12, No. 8, Aug. 2002, pp. 646-659.*

(Continued)

*Primary Examiner*—Yubin Hung
(74) *Attorney, Agent, or Firm*—Adeli & Tollen LLP

(57) ABSTRACT

A method for encoding video with a two-dimensional (2D) transform separable to two one-dimensional (1D) transforms. The method receives an array of values for a subsection of an image, performs a first 1D-transform of the array, transposes the resulting array, and performs a second 1D-transform of the array resulting from the transpose. The method, without performing another transpose, generates a data stream using a transposed scan order based on the values of the array resulting from the second transform. A method for decoding video encoded by a 2D transform, which separable to two 1D transforms. The method receives a data stream containing encoded values for an image, parses out the values into an array using a transposed scan order, performs a first 1D-inverse transform on the array, transposes the resulting array, and performs a second 1D-inverse transform of the array resulting from the transpose to produce a decoded output.

12 Claims, 10 Drawing Sheets

U.S. PATENT DOCUMENTS 6,680,972 B1 * 1/2004 Liljeryd et al. ............. 375/240
6,871,208 B1 3/2005 Guo et al.
7,020,671 B1 3/2006 Saha

OTHER PUBLICATIONS

Bhaskaran et al., Image and Video Compression: Standards Algorithms and Architectures, 2nd Edition, 1997, pp. 150, 151, 188.*
U.S. Appl. No. 10/427,556, filed Apr. 30, 2003, Roger Kumar.

* cited by examiner

VIDEO ENCODING AND DECODING

RELATED APPLICATIONS

This patent application claims the benefit under title 35, United States Code, Section 119(e) to the United States Provisional Patent Application entitled "Method and Apparatus for Performing a Two-Dimensional Inverse Discrete Cosine Transform," having Ser. No. 60/396,157 filed on Jul. 14, 2002.

FIELD OF THE INVENTION

The present invention is directed towards video encoding and decoding.

BACKGROUND OF THE INVENTION

Moving Picture Experts Group (MPEG) video compression is currently used in many video products such as digital television set-top boxes, DSS, HDTV decoders, DVD players, video conferencing, Internet video, and other applications. These products benefit from MPEG video compression since compressed video requires less storage space for video information and less bandwidth for the transmission of the video information.

An MPEG video is a sequence of video frames comprised of intra coded I-frames and/or inter coded P and B-frames, as is well known in the art. Each video frame is typically divided into sub-sections of macro blocks (16×16 pixels). A macro block typically includes sub-sections of four 8×8 luminance blocks and two 8×8 chrominance blocks. A luminance block specifies brightness information (e.g., luminance image coefficients) about the pixels in the block, while the two chrominance blocks specify Cr and Cb color information (e.g., Cr and Cb image coefficients) about the pixels in the macro block.

MPEG video encoding and decoding processes typically use discrete cosine transform ("DCT") and inverse DCT ("iDCT") to encode and decode blocks. A DCT operation takes image values defined in a spatial domain and transforms them into a frequency domain. The DCT operation transforms the inputted image values into a linear combination of weighted basis functions. These basis functions are the frequency components of the inputted image values. As such, when a DCT operation is applied to a block of image values, it yields a block of weighted values corresponding to how much of each basis function is present in the original image to be encoded.

For most images, most of the image information lies at low frequencies which appear in the upper-left corner of the DCT-encoded block. The lower-right values of the DCT-encoded block represent higher frequencies, and are often small enough to be neglected with little visible distortion. The top left corner value in the DCT-encoded block is the DC (zero-frequency) component and lower and rightmore entries represent larger vertical and horizontal spatial frequencies.

The DCT operation is a separable transform in that the matrix that defines this transformation is decomposable into two matrices, one that corresponds to a column transform and another that corresponds to a row transform. Thus it can be implemented as two one-dimensional (1D) transforms. In other words, a two-dimensional (2D) DCT is just a 1D DCT applied twice, once in the column direction and once in the row direction. In the case of a 1D 8-point DCT, the first coefficient (the DC coefficient) represents the average value of the image values and the eighth coefficient represents the highest frequencies found in the image. An iDCT operation is used to convert the frequency coefficients back into the image information.

DCT encoding of a block is a 2D transformation operation that can be expressed by the following formula:

$$F(u,v) = \frac{C_u}{2}\frac{C_v}{2}\sum_{y=0}^{7}\sum_{x=0}^{7} f(x,y)\cos\left[\frac{(2x+1)u\pi}{16}\right]\cos\left[\frac{(2y+1)v\pi}{16}\right]$$

with: $C_u = \begin{cases} \frac{1}{\sqrt{2}} & \text{if } u=0 \\ 1 & \text{if } u>0 \end{cases}$ ; $C_v = \begin{cases} \frac{1}{\sqrt{2}} & \text{if } v=0, \\ 1 & \text{if } v>0 \end{cases}$ In the formula above, a column dimension of the block is represented by x values and a row dimension of the block is represented by y values, so that f(x,y) is the image information at position [x,y] of the block. As such, F(u,v) is the 2D-encoded image information at position [u,v] of the 2D-encoded block.

DCT encoding is a separable two-dimensional (2D) transform operation. The separable nature of the DCT encoding operation can be exploited by (1) performing a first one-dimensional (1D) DCT operation in the column direction of the image block to produce a 1 D-encoded block, and then (2) performing a second 1D DCT operation in the row direction of the 1 D-encoded block to produce a 2D-encoded block. Alternatively, the first 1D DCT operation can be performed in the row direction of the block and the second 1D DCT operation performed in the column direction of the block. The scaled-version of the Chen method can be used to perform the two 1D DCT operations. This scaled-version is described in the paper "2D Discrete Cosine Transform," which can be found on the Internet, incorporated herein by reference.

The Chen algorithm is an efficient implementation of the DCT operation that requires a fewer number of computations than a straightforward implementation of the DCT. While a straightforward implementation of the DCT requires a number of computations that is proportional to N^2 (where N=8 for an 8-point DCT), the Chen algorithm exploits symmetry and periodicity inherent in the DCT calculation to reduce the number of computations to an amount proportional to N log(N).

FIG. 1 presents a flowchart of a conventional process 100 that DCT encodes a block and outputs the DCT-encoded block. This process uses two separate 1D DCT transform operations. The process initially performs (at 105) a 1D DCT operation on the block in the block's column direction to produce a 1D-encoded block. The process then performs (at 110) a transpose operation on the 1D-encoded block to produce a transposed 1D-encoded block. A transpose operation interchanges the row and columns of an array. In other words, a transpose $A^T$ of an array A is an array that is symmetrically related to the array A, such that row i in $A_T$ is column j in A, and column j in $A^T$ is row i in A.

The process then performs (at 115) a 1D DCT operation on the transposed 1D-encoded block to produce a transposed 2D-encoded block. The process 100 performs the 1D DCT operation at 115 in the column direction of the transposed 1D-encoded block. Therefore, the 1D DCT operation is actually being performed in the row direction of the block since the result of the initial transformation operation at 105 was transposed at 110. The process then performs (at 120) a transpose operation on the transposed 2D-encoded block to produce a 2D-encoded block.

After the process performs (at 120) the second transpose operation, the process quantizes (at 125) the 2D-encoded block to produce a quantized 2D-encoded block. For an MPEG encoding, the quantization entails dividing each value of the 2D DCT-encoded block by a value of a quantization matrix. Because of the scalar values in the quantization matrix, this division often results in the reduction of the values of the DCT-encoded block.

To produce a bit stream of values (i.e., data stream), the process then rasterizes (at 130) values of the quantized 2D-encoded block according to a zig zag scan order. A zig zag scan order is commonly used to arrange DCT-coded image coefficients of an image block into a bit stream. FIG. 2 illustrates a conventional zig zag scan order 205 of an 8×8 image block 210. The block 210 contains image coefficients C0, C1, C2, etc. that are numbered from left to right and top to bottom. The zig zag scan order specifies the following sequence for outputting image coefficients to produce the bit stream: C0, C1, C8, C16, C9, C2, . . . After 130, the process 100 ends.

A DCT decoder performs an inverse DCT transformation on a DCT encoded block to reconstruct the block. DCT decoding of a block is also a two-dimensional (2D) transformation operation, which can be expressed by the following formula:

$$f(x, y) = \sum_{u=0}^{7} \sum_{v=0}^{7} F(u, v) \frac{C_u}{2} \frac{C_v}{2} \cos\left[\frac{(2x+1)u\pi}{16}\right] \cos\left[\frac{(2y+1)v\pi}{16}\right]$$

In the formula above, the columns of the 2D-encoded block are represented by u values and the rows of the 2D-encoded block are represented by v values, so that F(u,v) is the encoded image data at position [u,v] of the block. As such, f(x,y) is the image data at position [x,y] of the block.

Like DCT encoding, DCT decoding is a separable two-dimensional (2D) transform operation. The separable nature of the iDCT decoding can be exploited by (1) performing a first 1D iDCT process in the column direction of the 2D-encoded block to produce a 1D-encoded block and then a second 1D iDCT process in the row direction of the encoded block to produce the block. Alternatively, the first 1D iDCT operation can be performed in the row direction of the 2D-encoded block and the second 1D iDCT operation can be performed in the column direction of the encoded block. The scaled-version of the Chen method can be used to perform two 1D iDCT operations. This scaled-version is described in the paper "2D Inverse Discrete Cosine Transform," which can be found on the Internet, incorporated herein by reference.

FIG. 3 presents a flowchart of a conventional process 300 that receives a DCT-encoded bit stream, generates a DCT-encoded block, and decodes the block. The process starts when it receives a bit stream of values. The process parses out and derasterizes (at 305) the values of the bit stream and stores the values in a block according to the zig zag scan order illustrated in FIG. 2. The block at this stage is referred to as a quantized 2D-encoded block.

The process then performs (at 307) an inverse quantization process on the quantized 2D-encoded block to produce a 2D-encoded block. For MPEG decoding, the quantization entails multiplying each value of the quantized 2D-encoded block by a value of a quantization matrix. Because of the scalar values in the quantization matrix, this multiplication often increases the values of the DCT-encoded block.

The process then performs (at 310) a 1D iDCT operation on the 2D-encoded block in the block's column direction. This operation results in a 1D DCT-encoded block. The process then performs (at 315) a transpose operation on the 1D-encoded block to produce a transposed 1D-encoded block. The process then performs (at 320) a 1D iDCT operation on the transposed 1D-encoded block to produce a transposed block. The 1D iDCT operation is performed in the block's column direction. Therefore, the 1D iDCT operation at 320 is actually being performed in the row direction of the block since the result of the initial transformation operation at 310 was transposed at 315. The process then performs (at 325) a transpose operation on the transposed block to produce a DCT-decoded block. After 325, the process ends.

A conventional MPEG encoder often includes a feedback decoding loop that decodes DCT-encoded blocks. MPEG encoders have such feedback loops in order to reconstruct previous frames that they will use in the encoding of subsequent frames. FIG. 4 presents a conventional encoding process 400 that employs such a feedback loop. The operations of the process 400 are similar to the operations of the processes 100 and 300 of FIGS. 1 and 3. Hence, similar numbers are used to described similar operations in these figures.

The process 400 starts when it receives a block. The process initially performs (at 105) a 1D DCT operation on the received block to produce a 1D DCT-encoded block. The process then performs (at 110) a transpose operation on the 1D DCT-encoded block to produce a transposed 1D DCT-encoded block. The process next performs (at 115) a 1D DCT operation on the transposed 1D-encoded block to produce a transposed 2D-encoded block. The process then performs (at 120) a transpose operation on the transposed 2D-encoded block to produce a 2D-encoded block. The process produces (at 125) a quantized 2D-encoded block by performing a quantization operation on the 2D-encoded block.

The feedback operations then commence at 307, when the process performs an inverse quantization operation on the quantized 2D-encoded block to produce a 2D-encoded block. The process then performs (at 310) a 1D iDCT operation on the 2D-encoded block. This operation produces a 1D DCT-encoded block. The process performs (at 315) a transpose operation on the 1D DCT-encoded block, in order to produce a transposed 1D DCT-encoded block. The process then performs (at 320) another 1D DCT operation on the transposed 1D-encoded block. This operation produces a transposed block that has been fully decoded. The process then performs (at 325) a transpose operation on the transposed block. This transposition operation results in a block that but for the lossy quantization operation would have been identical to the block received by the process 400.

Traditional video encoders and decoders require a lot of computational resource. For instance, transposition operations of conventional encoders and decoders are computationally intensive. Therefore, there is a need in the art for video encoders and decoders that require less computational resources. In particular, there is a need for encoders and decoders that would provide more efficient ways of performing transposition operations. Ideally, such encoder and decoders would adaptively perform their transposition operations based on their received data.

SUMMARY OF THE INVENTION

Some embodiments of the invention provide a method for encoding video based on a two-dimensional (2D) transform encoding operation that is separable in to two one-dimensional (1D) transform encoding operations. The video includes several successive images, where each image has several two-dimensional sub-sections. The method receives an array of image values that are for a sub-section of an image. It then performs a 1D-transform of the image-value array to produce a 1D-encoded image-value array. The method transposes the 1D-encoded image-value array to produce a transposed 1D-encoded image-value array. The method next performs a 1D-transform of the transposed 1D-encoded image-value array to produce a transposed 2D-encoded image-value array. Without performing another transpose operation, the method then generates a data stream based on the values of the transposed 2D-encoded image-value array. In some embodiments, the method generate the data stream by using a particular scan order to read out the values in the transposed 2D-encoded image-value array or an array that is derived from the transposed 2D-encoded image-value array. The particular scan order is a transposed zig-zag scan order in some embodiments.

Some embodiments of the invention provide a method for decoding video that has been encoded according to a two-dimensional (2D) transform encoding operation, which is separable in to two one-dimensional (1D) transform operations. The method initially receives a data stream that contains image values for an image. The method then parses out encoded image values from the data stream and stores the image values in a two-dimensional array in a particular scan order. At this stage, the image values in the array are encoded according to the 2D transform encoding. The method then performs a 1D-inverse transform operation on image-value array to produce a 1D-encoded image-value array. The method then transposes the 1D-encoded image-value array to produce a transposed 1D-encoded image-value array. The method next performs another 1D-inverse transform operation on the image-value array after the transpose operation. The result of this inverse transform operation is an array that contains decoded image value, and is the decoded output of the method. The above-mentioned scan order creates the initial 2D-encoded image array in a state that is transposed in relation to the decoded image array that exists after the second 1D inverse transform operation. In other words, the columns in the 2D-encoded image array correspond to the rows in the decoded image array, and the rows in the 2D-encoded image array correspond to the columns in the decoded image array.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
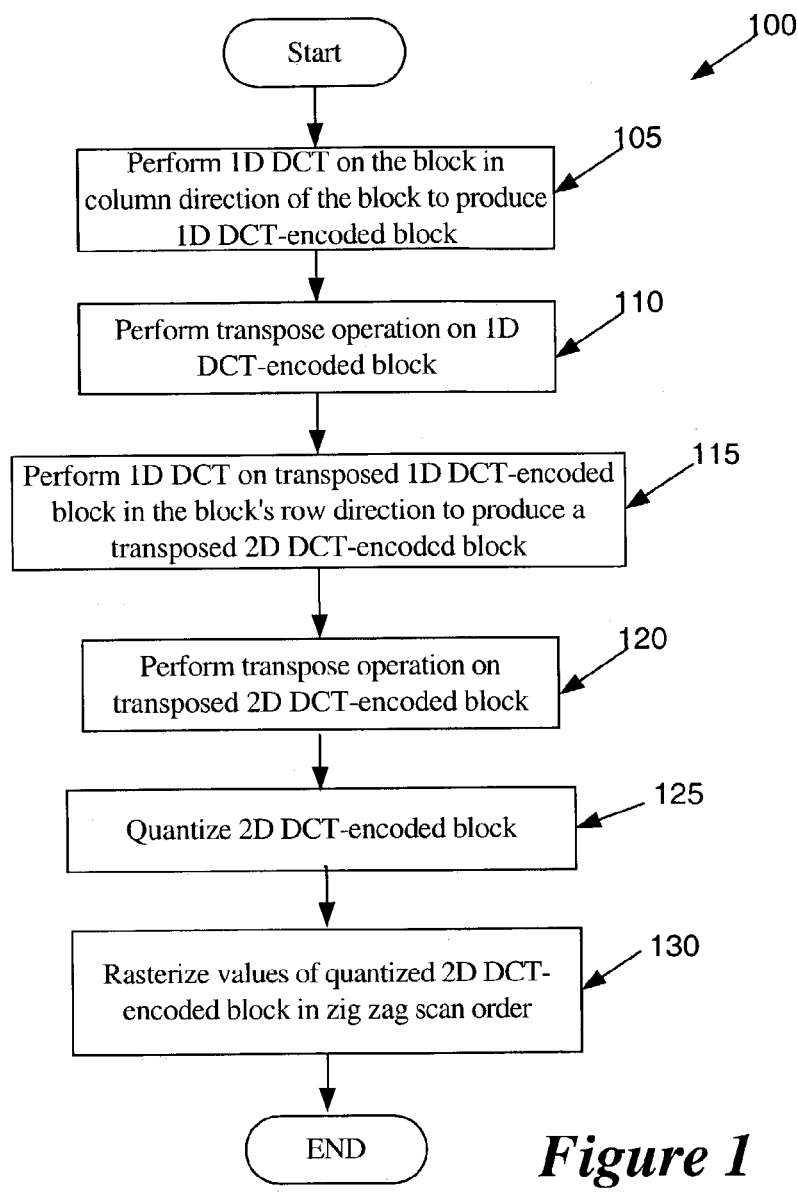
FIG. 1 shows a flowchart of a prior art process of encoding a block of a video frame.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for encoding video based on a two-dimensional (2D) transform encoding operation that is separable in to two one-dimensional (1D) transform encoding operations. The video includes several successive images, where each image has several two-dimensional sub-sections. The method receives an array of image values that are for a sub-section of an image. It then performs a 1D-transform of the image-value array to produce a 1D-encoded image-value array. The method transposes the 1D-encoded image-value array to produce a transposed 1D-encoded image-value array. The method next performs a 1D-transform of the transposed 1D-encoded image-value array to produce a transposed 2D-encoded image-value array. Without performing another transpose operation, the method then generates a data stream based on the values of the transposed 2D-encoded image-value array. In some embodiments, the method generate the data stream by using a particular scan order to read out the values in the transposed 2D-encoded image-value array or an array that is derived from the transposed 2D-encoded image-value array. The particular scan order is a transposed zig-zag scan order in some embodiments.

Some embodiments of the invention provide a method for decoding video that has been encoded according to a two-dimensional (2D) transform encoding operation, which is separable in to two one-dimensional (1D) transform operations. The method initially receives a data stream that contains image values for an image. The method then parses out encoded image values from the data stream and stores the image values in a two-dimensional array in a particular scan order. At this stage, the image values in the array are encoded according to the 2D transform encoding. The method then performs a 1D-inverse transform operation on image-value array to produce a 1D-encoded image-value array. The method then transposes the 1D-encoded image-value array to produce a transposed 1D-encoded image-value array. The method next performs another 1D-inverse transform operation on the image-value array after the transpose operation. The result of this inverse transform operation is an array that contains decoded image value, and is the decoded output of the method. The above-mentioned scan order creates the initial 2D-encoded image array in a state that is transposed in relation to the decoded image array that exists after the second 1D inverse transform operation. In other words, the columns in the 2D-encoded image array correspond to the rows in the decoded image array, and the rows in the 2D-encoded image array correspond to the columns in the decoded image array.

Several embodiments are described below by reference to FIGS. 5-12. These embodiments are part of an MPEG encoder or decoder that encodes or decodes video frames by using 2D DCT and iDCT operations on 8-by-8 image blocks. One of ordinary skill, however, will realize that other embodiments might use other compression techniques (e.g., H.263 compression). Alternatively, other embodiments might use other types of transformations (such as those used in MPEG 4 part 10). Also, other embodiments might apply their transform operations on different size blocks, such as 4×4, 8×4, or any n×m set of pixels, where n and m are integers.

As used herein, the term "encoded block" refers to the encoded (i.e., transformed) state of a block in relation to an image block on which a transformation operation is performed. For example, a 2D-encoded block denotes an image block in which the image information has been encoded (i.e., transformed) in two dimensions. If a 1D-inverse transform is applied to a 2D-encoded block, a 1D-encoded block is produced. If a second 1D-inverse transform is applied, a decoded image block is produced.

The term "transposed" refers to the transpose state of a block in relation to a received or constructed block that contains encoded or decoded image data. For example, a transposed 2D-encoded block denotes an image block that is in a transposed state in which the image information has been encoded in two dimensions. The transposed 2D-encoded block will not have transposed values of the image block as its values are encoded along two dimensions. But, it will have transposed row and column coordinates in relation to the image block (i.e., row i of the transposed 2D-encoded block is column j of the image block and column j of the transposed 2D-encoded block is row i of the image block). If the transposed 2D-encoded block is transposed, a 2D-encoded block is produced that is not in transposed state in relation to the image block (i.e., row i of the 2D-encoded block is row i of the image block and column j of the 2D-encoded block is column j of the image block).

Figure 5:
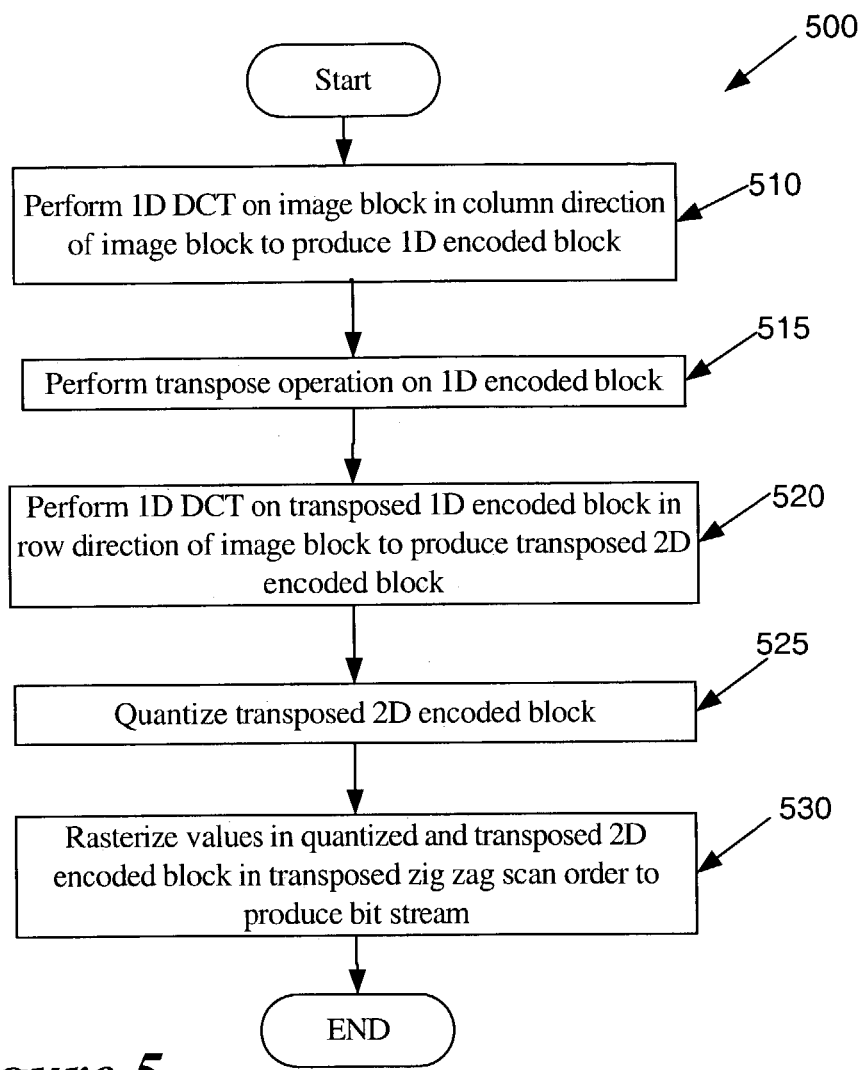
FIG. 5 shows a flowchart of an improved process of encoding a block of a video frame in accordance with the present invention.
Figure 7:
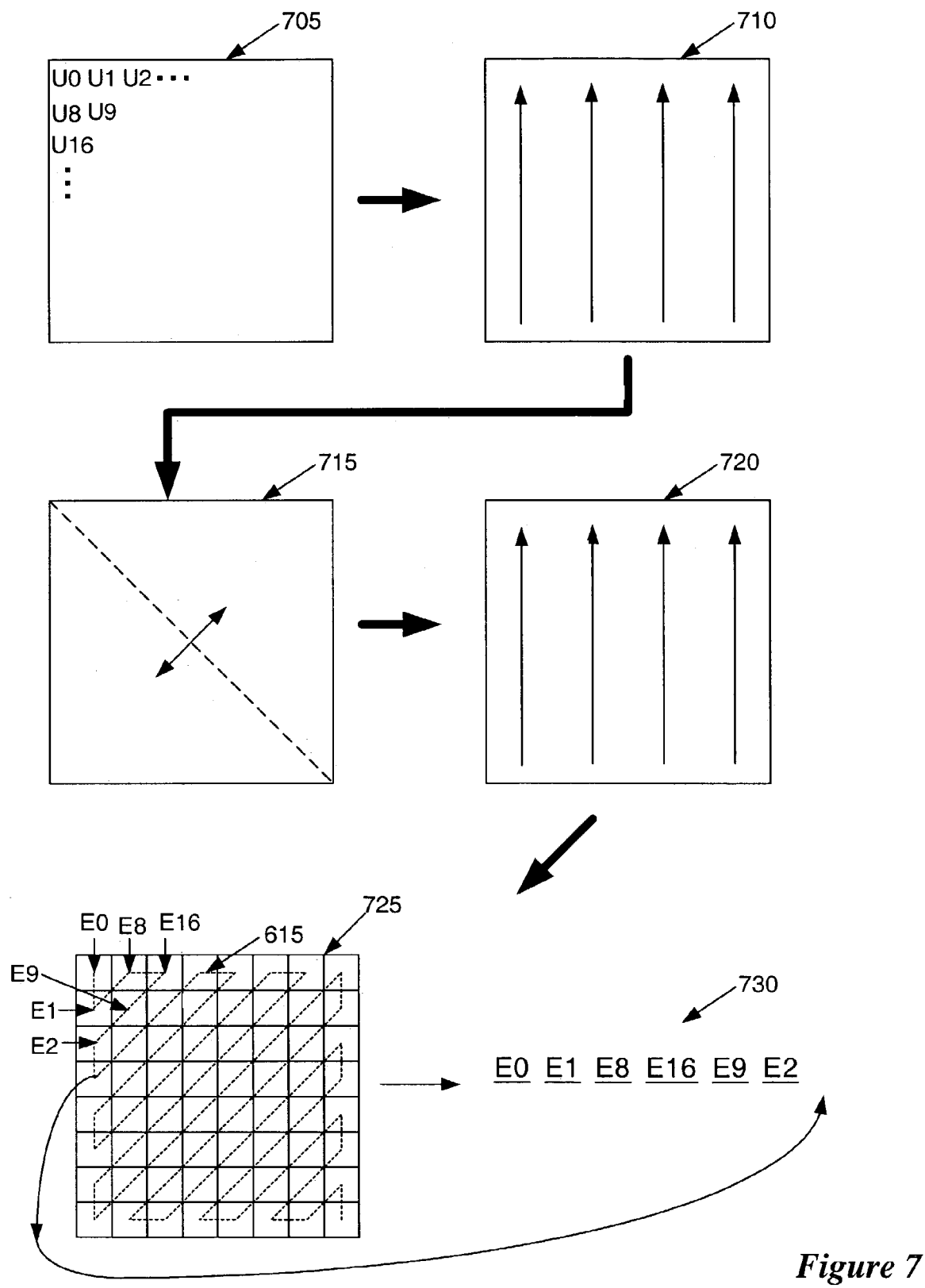
FIG. 7 shows a conceptual diagram of various stages of the encoding process of FIG. 5.

FIG. 5 illustrates a process 500 that DCT encodes an image block and outputs the DCT-encoded block. This process 500 will be explained by reference to FIG. 7, which shows a conceptual diagram of various stages of the process 500. As shown in FIG. 7, the image block 705 contains uncoded image coefficients U0, U1, U2, etc. that are numbered from left to right and top to bottom.

The process 500 uses two separate 1D DCT transform operations. The process initially performs (at 510) a 1D DCT operation on an image block 705 in the block's column direction to produce a 1D-encoded block. This operation is conceptually illustrated as block 710 in FIG. 7. The process then performs (at 515) a transpose operation on the 1D-encoded block to produce a transposed 1D-encoded block. The transpose operation is pictorially illustrated as block 715 in FIG. 7. As shown in block 715, the transpose operation entails swapping the value at row i, column j with the value at row j, column i, for every possible permutation of i and j. The values that are at the same row and column number are not swapped but remain in place.

The process then performs (at 520) a 1D DCT operation on the transposed 1D-encoded block in the column direction of the transposed 1D-encoded block, in order to produce a transposed 2D-encoded block. In effect, the 1D DCT operation is actually being performed in the row direction of the image block since the result of the initial transformation operation at 510 was transposed at 515. The second 1D DCT operation at 520 is illustrated in block 725 in FIG. 7. As shown in FIG. 7, the second 1D DCT results in block 725, which contains encoded image coefficients E0, E8, E16, etc. that are in a transposed state compared to the unencoded coefficients U0, U1, U2, etc. of the received image block 705.

The scaled-version of the Chen method can be used to perform (at 510 and 520) the two 1D DCT operations. This scaled-version is described in the paper "2D Discrete Cosine Transform," which can be found on the Internet, incorporated herein by reference. The Chen algorithm is an efficient implementation of the DCT operation that requires a fewer number of computations than a straightforward implementation of the DCT. While a straightforward implementation of the DCT requires a number of computations that is proportional to $N^2$ (where N=8 for an 8-point DCT), the Chen algorithm exploits symmetry and periodicity inherent in the DCT calculation to reduce the number of computations to an amount proportional to $N \log(N)$.

After the process performs (at 520) the second 1D DCT operation, the process quantizes (at 525) the transposed 2D-encoded block to produce a quantized and transposed 2D-encoded block. For an MPEG encoding, the quantization entails multiplying each value of the transposed 2D-encoded block (that exists after 520) by a value of a quantization matrix. In some embodiments, the quantization matrix is a transposed version of a traditional quantization matrix that is used for MPEG encoding. A transposed quantization matrix is used because the process 500 does not perform a second transpose operation before rasterizing the data. Also, because of the values in the transposed quantization matrix, the multiplication 2D-encoded block by the quantization matrix results in a quantized, 2D-encoded block with smaller encoded values.

The process then rasterizes (at 530) values of the quantized, transposed 2D-encoded block in a transposed zig-zag scan order to produce a bit stream. The transposed zig-zag scan order and rasterizing are illustrated in blocks 725 and as data stream 730 in FIG. 7. As can be seen from FIGS. 2 and 7, the transposed zig-zag scan order is identical to the zig-zag scan order of the prior art except that it has been flipped symmetrically about the diagonal line that connects the top-left and the bottom-right corners of the block.

Figure 2:
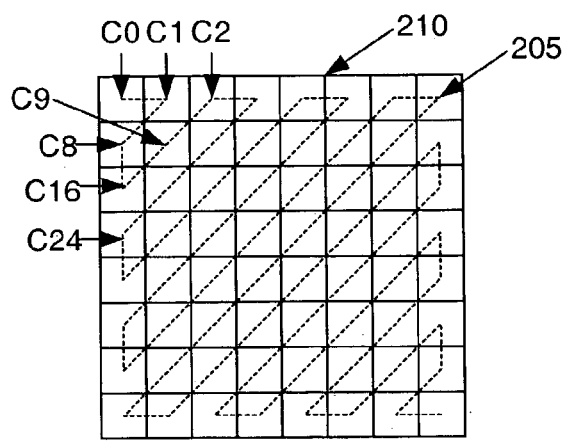
FIG. 2 shows a conventional zig zag scan order.
Figure 6:
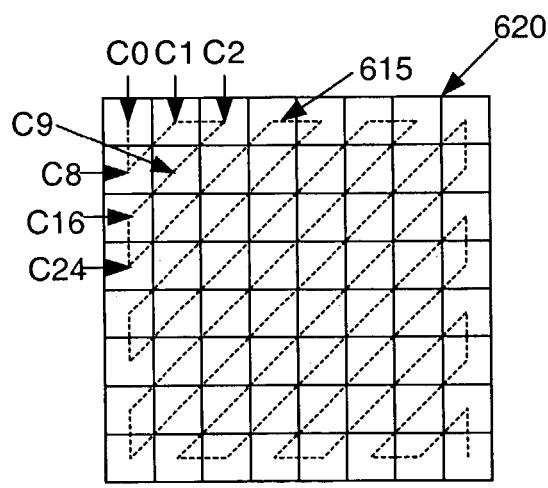
FIG. 6 shows a transposed zig zag scan order in accordance with the present invention.

In other words, the transposed scan order 615 of FIG. 7 is a transposed version of the conventional zig zag scan order 205 of FIG. 2. FIG. 6 illustrates the transposed zig zag scan order 615 in more detail for an 8-by-8 block 620. The block 620 contains image coefficients C0, C1, C2, etc. that are numbered from left to right and top to bottom. The transposed zig zag scan order 615 specifies the following sequence for outputting image coefficients to produce the bit stream: C0, C8, C1, C2, C9, C16, C24, . . . Hence, when the transposed zig zag scan order 615 is used for the block 725 of FIG. 7, the bit stream 730 will be in the following order: E0, E1, E8, E16, E9, E2, . . . .

This order would match the order that would be produced by the conventional process 100 and its conventional zig-zag scan order. In other words, using a transposed zig zag scan order 615 to produce a bit stream from the values of the quantized and transposed 2D-encoded block allows the process of the present invention to omit a second transpose operation before rasterization in the encoding process. This allows the process 500 to encode image information at a faster rate than prior processes since this process only performs one transpose operation while the prior processes performs two transpose operations (as described above in relation to FIG. 1).

Figure 8:
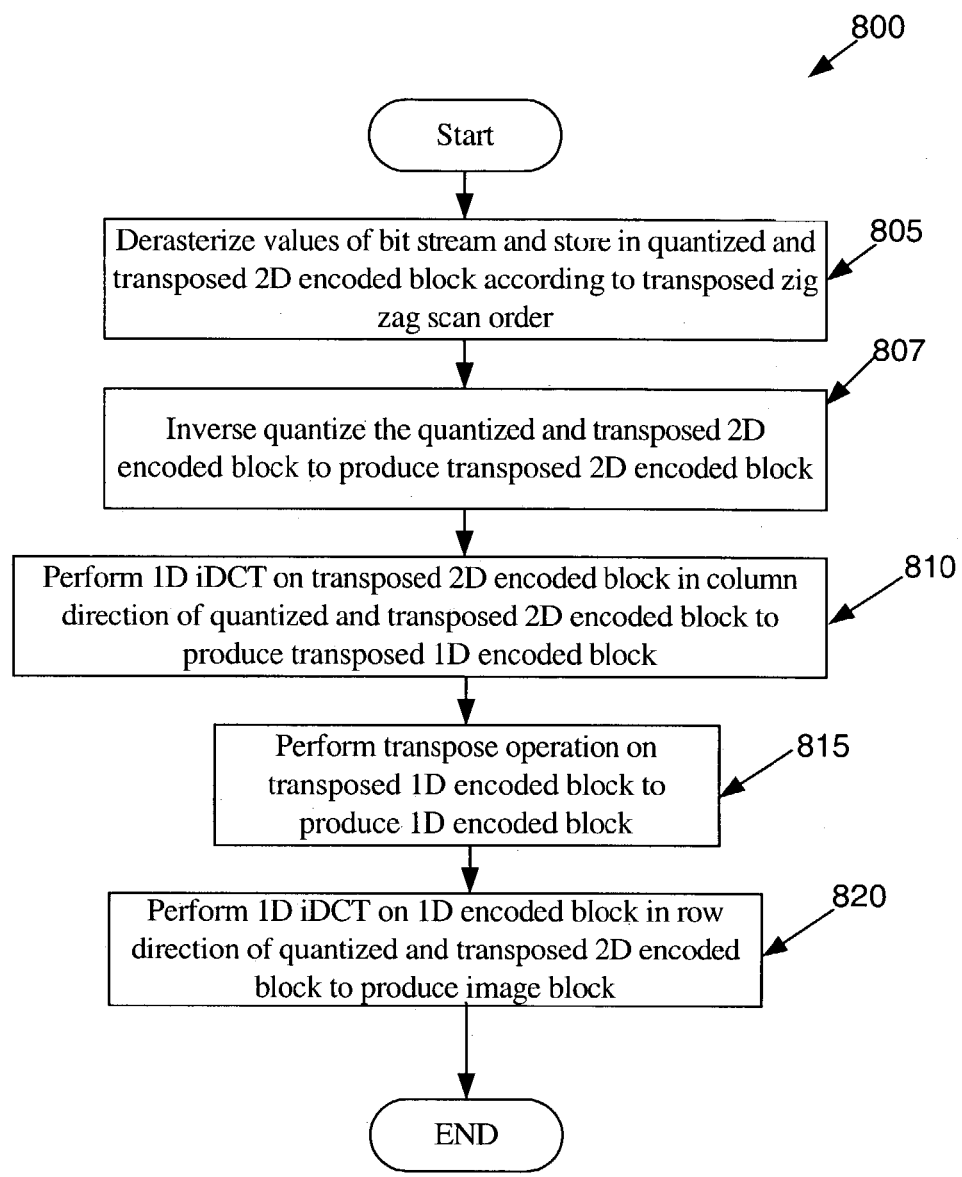
FIG. 8 shows an improved process for decoding a block of a video frame in accordance with the present invention.
Figure 9:
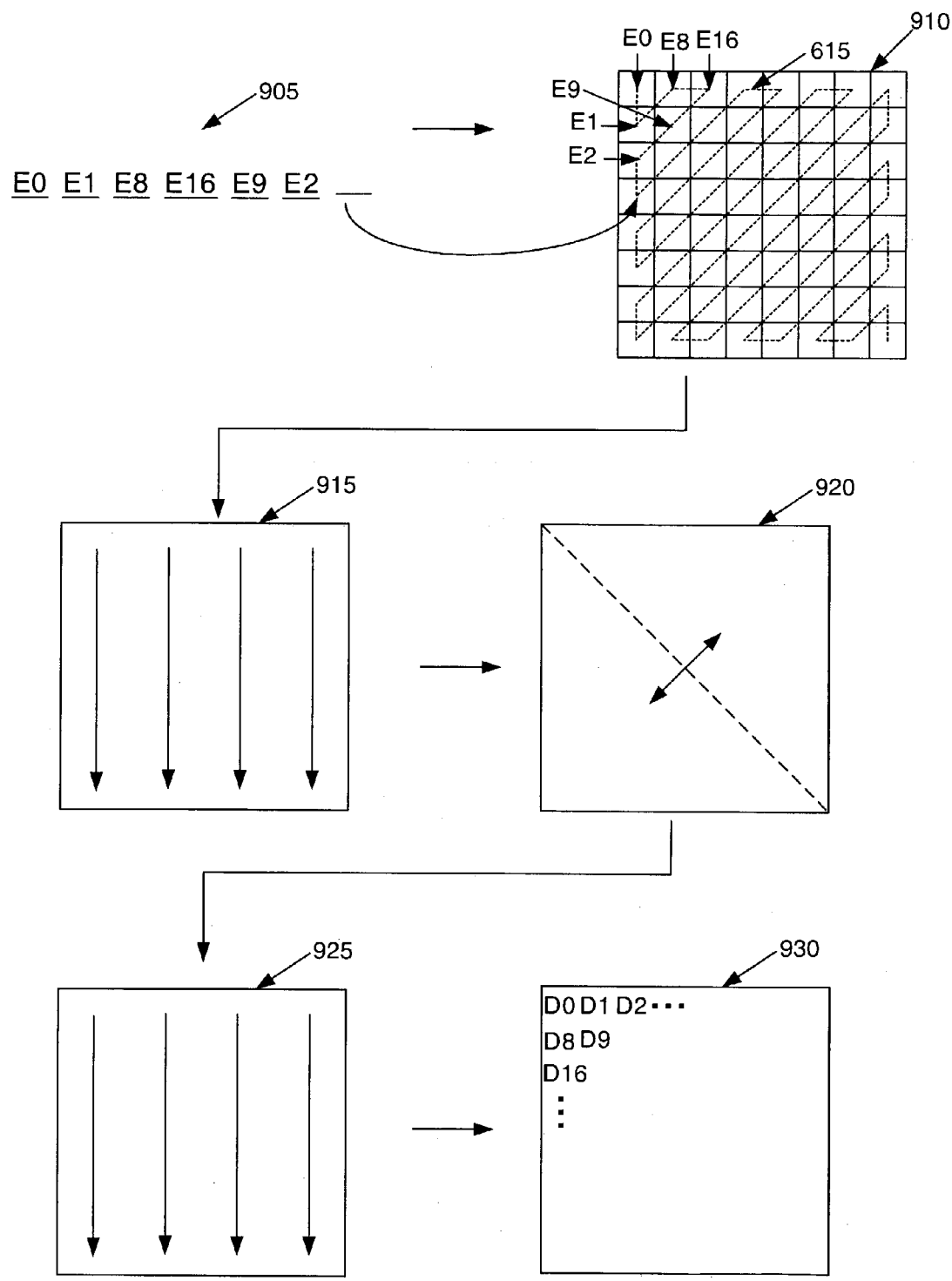
FIG. 9 shows a conceptual diagram of various stages of the decoding process of FIG. 8.

FIG. 8 presents a process 800 that receives a DCT-encoded bit stream, generates a DCT-encoded block, and decodes the block. This process will be described by reference to FIG. 9, which shows a conceptual diagram of various stages of the decoding process 800. The process 800 starts when it receives a data stream of values. As shown in FIG. 9, the bit stream 905 contains encoded image coefficients E0, E1, E8, E16, E9, E2, . . . .

The process 800 parses out and derasterizes (at 805) the values of the data stream and stores the values in a block according to the transposed zig-zag scan order 615. This operation is conceptually illustrated in block 910 of FIG. 9. The block at this stage is a quantized, transposed 2D-encoded block.

The process then performs (at 807) an inverse quantization process on the quantized, transposed 2D-encoded block to produce a transposed 2D-encoded block. For an MPEG encoding, the inverse quantization entails multiplying each value of the quantized, transposed 2D-encoded block by a value of a transposed quantization matrix. Because of the scalar values in the transposed quantization matrix, the multiplications often increases the values of the DCT-encoded encoded block. The transposed quantization matrix is a transposed version of the quantization matrix used by conventional MPEG inverse quantizers.

The process then performs (at 810) a 1D iDCT operation on the transposed 2D-encoded block in the block's column direction to produce a transposed 1D-encoded block. This operation is illustrated in block 915 of FIG. 9. The process next performs (at 815) a transpose operation on the transposed 1D-encoded block that exists after 810. This transpose operation is illustrated in block 920 of FIG. 9. This operation produces a 1D-encoded block. Any conventional set of transpose operations can be used to perform the transpose of the transposed 1D-encoded block. In some embodiments, however, the process uses an adaptive transpose process that is described below by reference to FIGS. 11 and 12.

The process then performs (at 820) a 1D IDCT operation on the 1D-encoded block in the block's column direction to produce an image block (shown as block 930). This operation is illustrated in block 925 of FIG. 9. Because of the transpose operation at 920, the 1D IDCT operation is actually being performed in the row direction of the encoded block. As shown in FIG. 9, the result of the second IDCT operation at 820 is an image block 930 that contains decoded image coefficients D0, D1, D2, etc. that are ordered appropriately from left to right and top to bottom. The scaled-version of the Chen method can be used to perform (at 810 and 820) the two 1D iDCT operations. This scaled-version is described in the paper "2D Inverse Discrete Cosine Transform," which can be found on the Internet, incorporated herein by reference.

Figure 3:
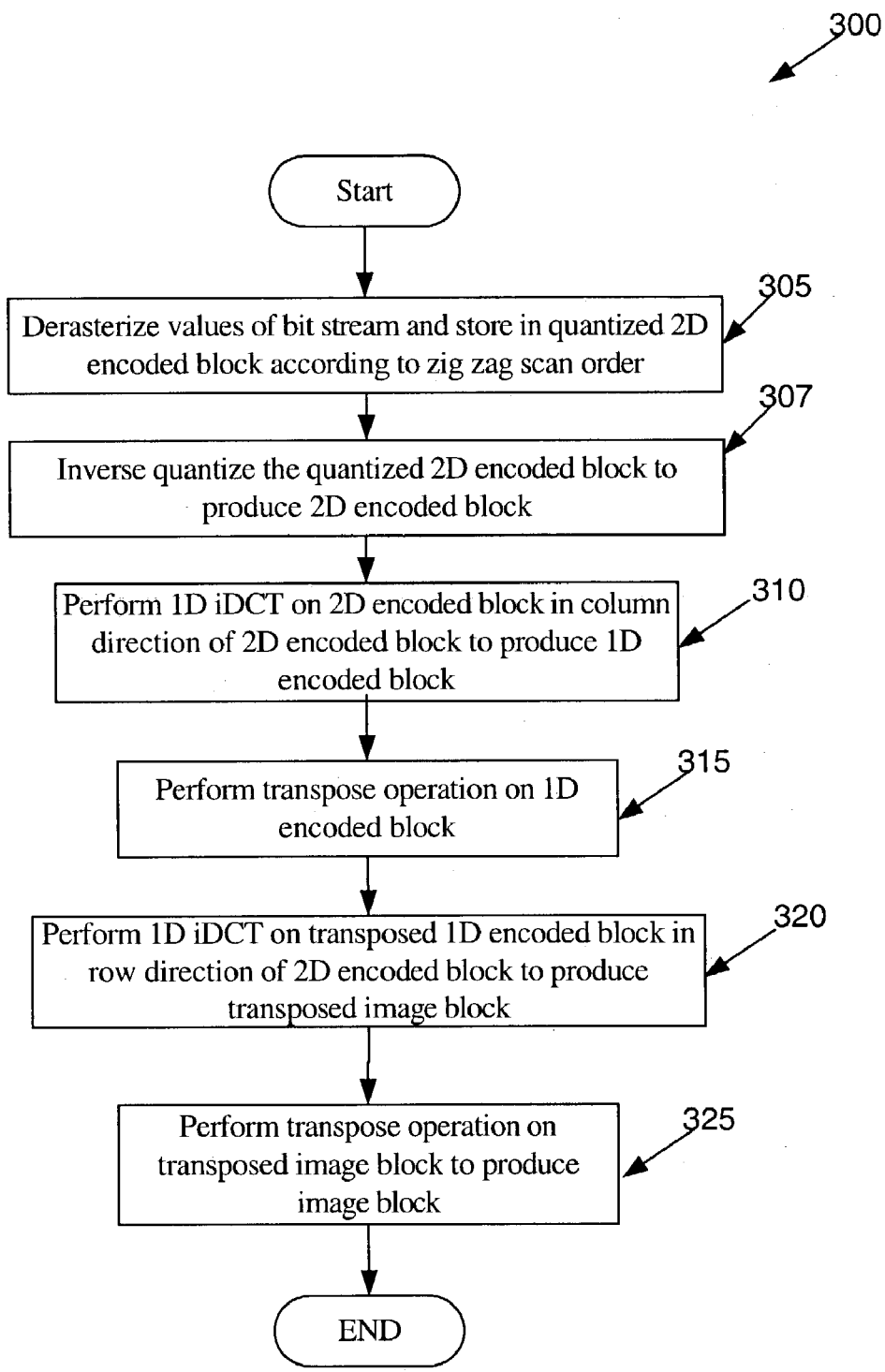
FIG. 3 shows a conventional process for decoding a block of a video frame.

There are several things to note about the process 800. First, the image block (produced at 820) is in a transposed state in relation to the quantized and transposed 2D-encoded block created at 805. This is due to the fact that the process 800 uses a transpose zig-zag scan order to create the block at 805. Using the transposed zig zag scan order 615 to store (at 805) values from the data stream in a block allows the process 800 to omit a second transpose operation in the decoding process 800. This allows the process 800 to decode image information at a faster rate than conventional MPEG decoding processes since the process 800 only performs one transpose operation while the prior methods perform two transpose operations (as described above in relation to FIG. 3).

Figure 10:
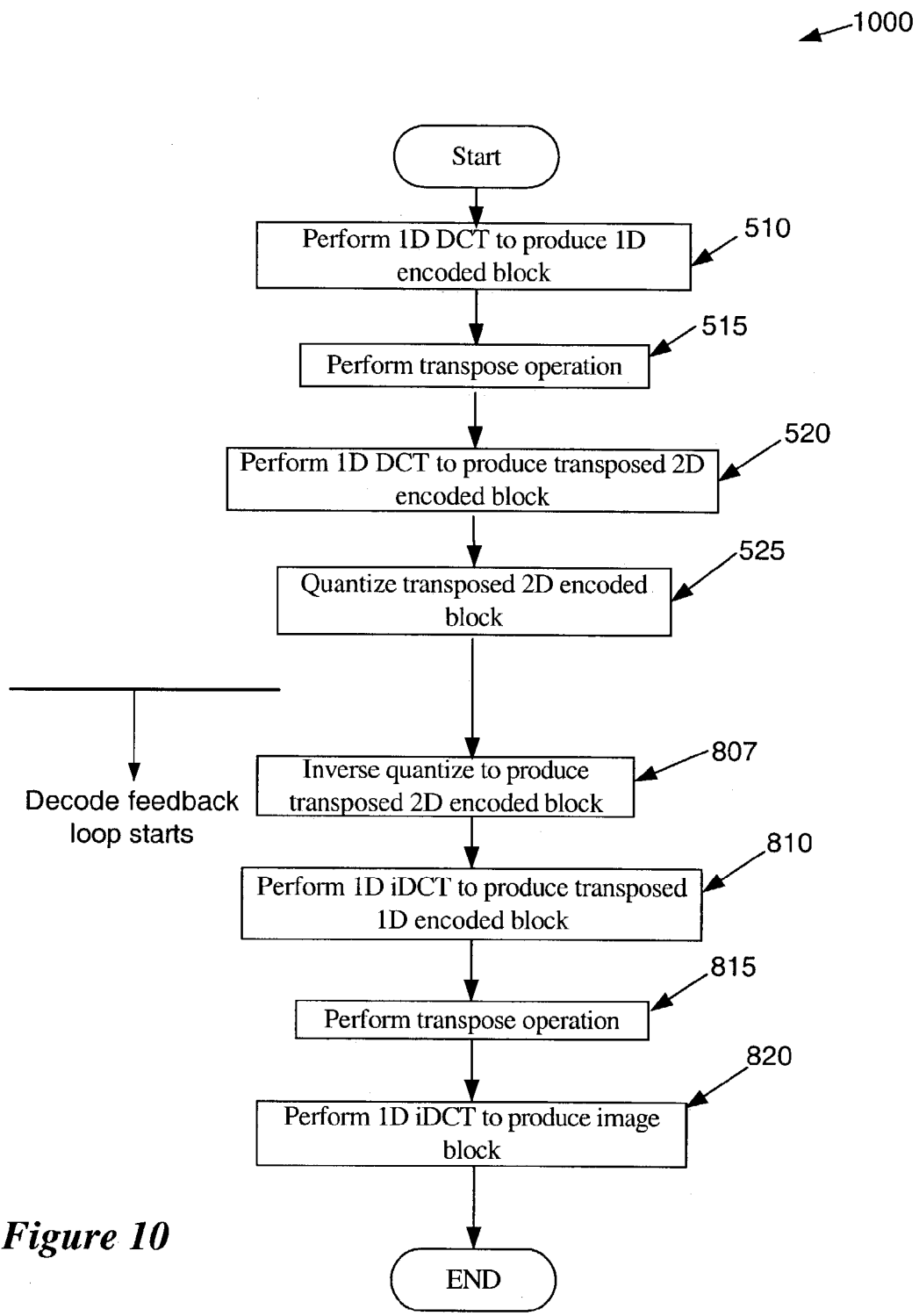
FIG. 10 presents an improved process for encoding a block of a video frame and then decoding the block in a feedback loop in accordance with the present invention.

MPEG encoding typically includes a feedback decoding loop that decodes DCT-encoded blocks to reconstruct previous frames that are used in the encoding of subsequent frames. FIG. 10 presents an improved encoding process 1000 that employs such a feedback loop. The operations of the process 1000 are similar to the operations of the processes 500 and 800 of FIGS. 5 and 8. Hence, similar numbers are used to described similar operations in these figures.

The process 1000 starts when it receives a block. The process initially performs (at 510) a 1D DCT operation on the received block to produce a 1D DCT-encoded block. The process then performs (at 515) a transpose operation on the 1D DCT-encoded block to produce a transposed 1D DCT-encoded block. The process next performs (at 520) a 1D DCT operation on the transposed 1D-encoded block to produce a transposed 2D-encoded block.

The process then produces (at 525) a quantized and transposed 2D-encoded block by performing a quantization operation on the transposed 2D-encoded block. Note that the quantized, transposed 2D-encoded block is in a transposed state in relation to the block received by the process 1000. This is due to the fact that only one transpose operation was performed (at 515) to encode the image information of the block.

The feedback operations then commence at 807, when the process performs an inverse quantization operation on the quantized, transposed 2D-encoded block to produce a transposed 2D-encoded block. The process then performs (at 810) a 1D iDCT operation on the transposed 2D-encoded block. This operation produces a transposed 1D DCT-encoded block. The process performs (at 815) a transpose operation on the transposed 1D DCT-encoded block to produce a 1D DCT-encoded block. The process then performs (at 820) another 1D iDCT operation on the 1D-encoded block. This operation produces a block that has been fully decoded and results in a block that, but for the lossy quantization operation, would have been identical to the block received by the process 1000. Note that the image block (produced at 820) is in a transposed state in relation to the quantized and transposed 2D-encoded block at the commencement of the feedback operations at 807. This is due to the fact that only one transpose operation was performed (at 815) in the feedback loop.

Figure 4:
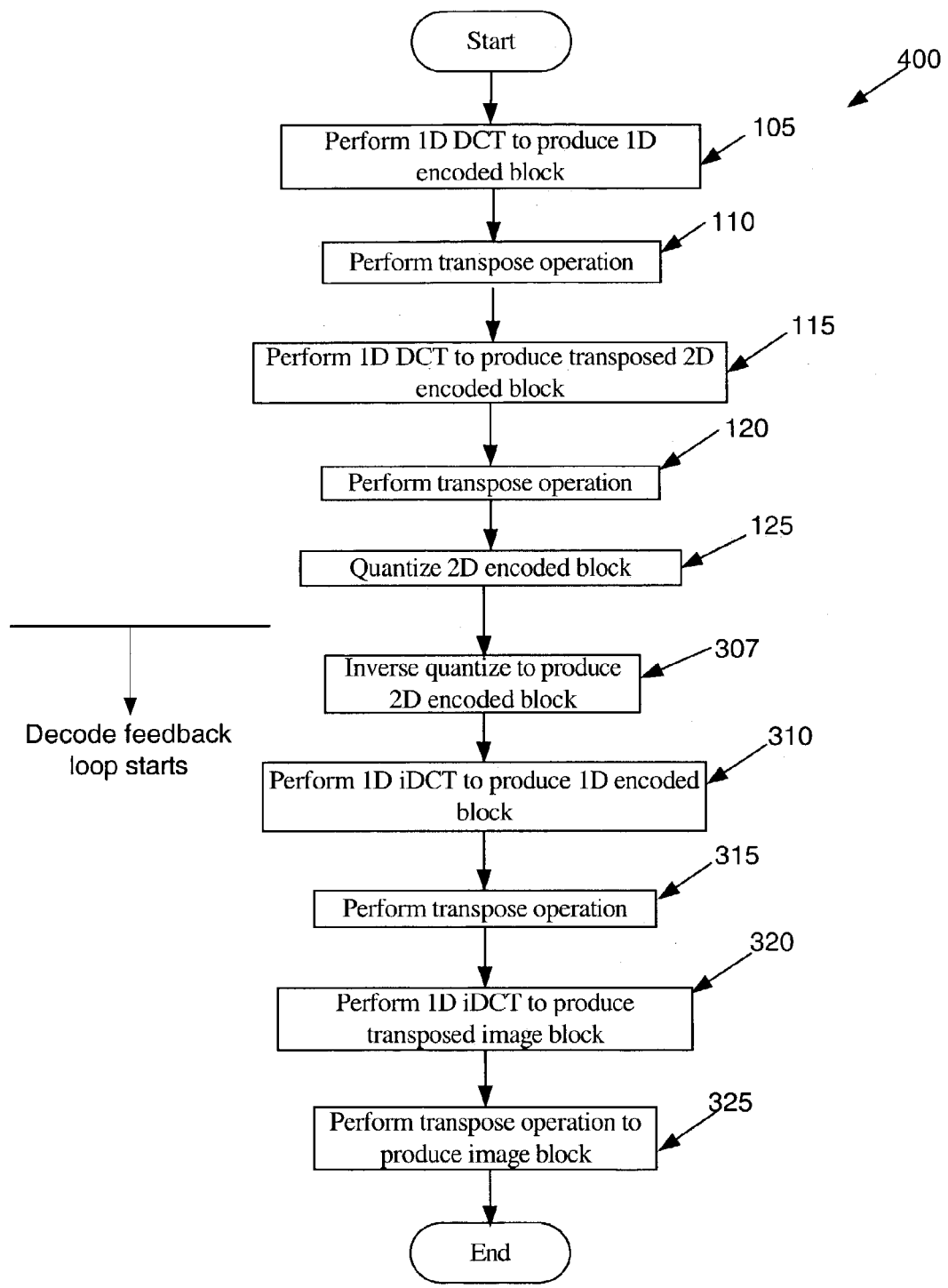
FIG. 4 shows a conventional MPEG-encoder's process for encoding a block of a video frame and then decoding the block in a feedback loop.

Also note that by not performing a second transpose operation in the encoding process (steps 510 through 525) prior to sending the quantized, transposed 2D-encoded block to the decode feedback loop, the decode feedback loop can omit a transpose operation at the end of the decoding process (steps 807 through 820). This allows the process of the present invention to encode image information using a decode feedback loop at a faster rate than the process of the prior art (as described above in relation to FIG. 4) since the present invention only performs two transpose operations (at 515 and 815) while the prior art method performs four transpose operations (at 110, 120, 315, and 325).

Figure 11:
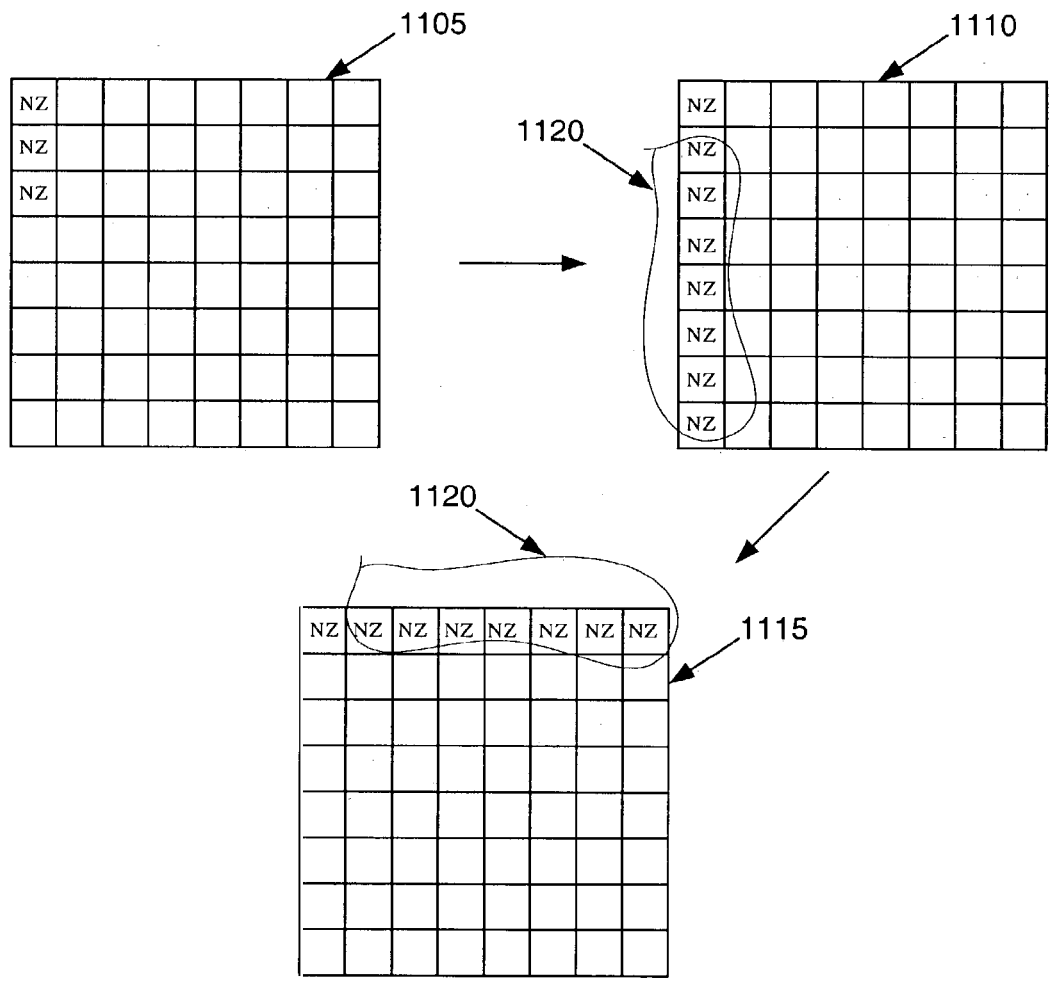
FIG. 11 illustrates an example of an optimized set of transpose operations for a particular pattern of non-zero coefficients of a block.

FIG. 11 illustrates an example of an optimized set of transpose operations for a particular pattern of non-zero coefficients of a block. This optimized set of transpose operations can be used, for example, to transpose an encoded or decoded block. FIG. 11 shows a 2D-encoded block 1105 that includes only three non-zero coefficients. A 1D IDCT operation performed on the 2D-encoded block 1105 produces a 1D-encoded block 1110. The 1D-encoded block 1110 includes only eight non-zero coefficients. A transpose operation is performed on the 1D-encoded block 1110 to produce a transposed 1D-encoded block 1115. The transposed 1D-encoded block 1115 can be produced by a conventional set of transpose operations. For instance, one conventional set of transpose operation includes 24 operations.

Instead of the conventional set of transpose operations, some embodiments try to identify a pattern of non-zero coefficients in a block, then determine whether they have an optimized set of transpose operations for the identified pattern, and if so, then use the optimized set of transpose operations. For instance, in the example illustrated in FIG. 11, some embodiments would first recognize the pattern of non-zero coefficients in the block 1105. These embodiments would then determine whether they have an optimized set of transpose operations for this pattern. For instance, they might use a look-up table that stores different patterns of non-zero coefficients and identifies different set of transpose operators (e.g., objects or functions) for each stored pattern. Hence, for such an approach, some embodiments determine whether the look-up table has an entry for the pattern of non-zero coefficients of block 1105. If so, they would use the set of transpose operators specified for this pattern. If not, they would use the default set of operations.

As the non-zero pattern of block 1105 will only result in at most eight coefficients in the first column of the block 1100 once a 1D iDCT operation has been performed on block 1105, an optimized set of transpose operations for the pattern illustrated in block 1105 could simply be seven transpose operations that would push the seven coefficients 1120 in the first column of block 1110 into the first row of block 1115. These seven transpose operations are substantially less than the conventional set of 24 transpose operations that are blindly performed traditionally without consideration of the pattern of non-zero coefficients of an encoded block.

Figure 12:
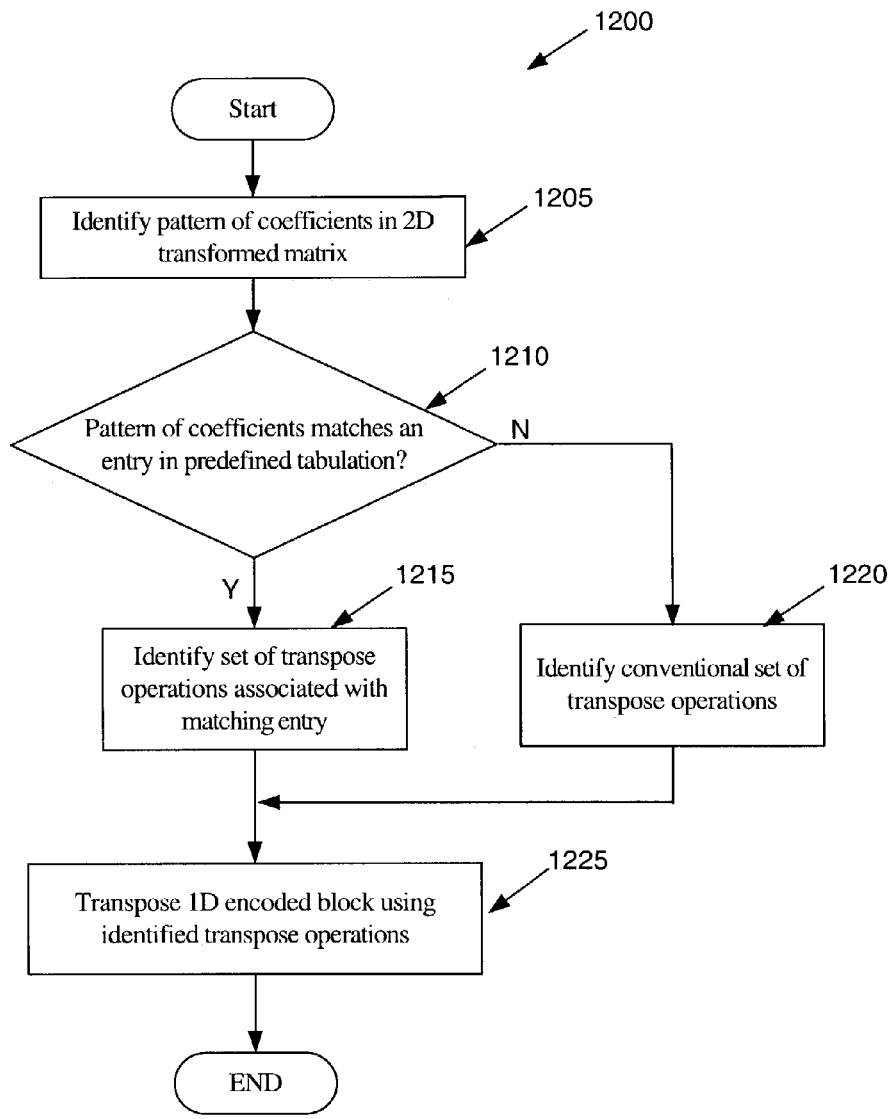
FIG. 12 shows a process for transposing a block by dynamically selecting and using an optimized set of transpose operations.

FIG. 12 shows a process 1200 for performing an adaptive transpose operation after a 1D iDCT operation is performed on a block containing 2D DCT-encoded values. The process 1200 initially identifies (at 1205) a pattern of non-zero coefficients in the received 2D-encoded block. The process then determines (at 1210) whether the pattern of non-zero coefficients of the 2D-encoded block matches an entry in a predefined tabulation (e.g., loop-up table) containing patterns of non-zero coefficients and a predefined set of transpose operations associated with each pattern entry.

If the process determines (at 1210) that a matching entry does not exist, the process selects (at 1220) a conventional set of transpose operations. If the process determines (at 1210) that a matching entry exists, the process identifies (at 1215) the set of transpose operations associated with the matching entry. The process then performs (at 1225) the identified set of transpose operations on the 1D-encoded block to produce a transposed 1D-encoded block.

While the invention has been described with reference to numerous specific details, one of ordinary skill in the art will recognize that the invention can be embodied in other specific forms without departing from the spirit of the invention. Several embodiments described above relate to MPEG compression. One of ordinary skill in the art, however, will realize that the invention can relate to other types of compression, such as H.263 compression. However, if other compression techniques are used, some of the aspects of the above-described processes might have to be modified. For example, if the processes described above are part of an H.263 compression scheme, then the quantization and inverse quantization operations are not transposed matrix multiplication operations but rather are scalar multiplications.

In addition, some embodiments described above describe a first transform or first inverse transform in a column direction of a block and a second transform or second inverse transform in a row direction of the block. One of ordinary skill in the art, however, will realize that the first transform or first inverse transform may be in the row direction of the block and the second transform or second inverse transform may be in the column direction of the block.

Also, a pre-multiplication operation is typically performed when performing two 1D DCT or iDCT operations. This pre-multiplication operation is not shown or described above so as to not obscure the description of the invention. Some embodiments, however, divide the pre-multiplication operation into two or more stages during an encoding or decoding process. One such approach is disclosed in U.S. patent application Ser. No. 10/427,556, entitled "Encoding and Decoding Data Arrays Using Separate Pre-Multiplication Stages," which is incorporated herein by reference. As disclosed in this application, some embodiments also introduce a scalar multiply in some cases to improve the efficiency of the multiplications.

We claim:

1. A method of dynamically transposing an image-value array associated with a video image, the method comprising:
    a) identifying a pattern of coefficients of the image-value array;
    b) determining whether a particular set of transpose operations exists for the identified pattern of coefficients;
    c) when the particular set of transpose operations exists for the identified pattern, using the particular set of transpose operations to transpose the image-value array; and
    d) when the particular set of transpose operations does not exist for the identified pattern, using a default set of transpose operations to transpose the image-value array.

2. The method of claim 1 wherein the pattern of coefficients is a pattern of non-zero coefficients.

3. The method of claim 1 wherein the image-value array includes encoded image values.

4. The method of claim 1 wherein the image-value array includes unencoded image values.

5. The method of claim 1 wherein detennining whether a particular set of transpose operations exists comprises a table look up operation.

6. The method of claim 5, wherein the table stores different patterns of non-zero coefficients and a set of corresponding transpose operations for each stored pattern.

7. A computer readable medium storing a computer program for dynamically transposing an image-value array associated with a video image, the computer program comprising sets of instructions for:
    a) identiPying a pattern of coefficients of the image-value array;
    b) detennining whether a particular set of transpose operations exists for the identified pattern of coefficients;

c) when the particular set of transpose operations exists for the identified pattern, using the particular set of transpose operations to transpose the image-value array; and d) when the particular set of transpose operations does not exist for the identified pattern, using a default set of transpose operations to transpose the image-value array.

8. The computer readable medium of claim 7, wherein the pattern of coefficients is a pattern of non-zero coefficients.

9. The computer readable medium of claim 7, wherein the image-value array includes encoded image values.

10. The computer readable medium of claim 7, wherein the image-value array includes unencoded image values.

11. The computer readable medium of claim 7, wherein determining whether a particular set of transpose operations exists comprises a table look up operation.

12. The computer readable medium of claim 11, wherein the table stores different patterns of non-zero coefficients and a set of corresponding transpose operations for each stored pattern.

* * * * *